United States Patent [19]

Ohtsuka et al.

[11] Patent Number: 4,587,098
[45] Date of Patent: May 6, 1986

[54] METHOD OF STABILIZED OPERATION OF ACID DIGESTION KETTLE OF TANTALUM

[75] Inventors: Katsuyuki Ohtsuka; Ryukichi Mizuno; Hitoshi Miyazaki, all of Tokai; Toshio Fukuzuka; Kazutoshi Shimogori, both of Kobe; Hiroshi Satoh, Suita; Fumio Kami Kubo, Kobe, all of Japan

[73] Assignees: Doryokuro Kakunenryo Kaihatsu Jigyodan, Tokyo; Kabushiki Kaisha Kobe Seiko Sho, Kobe, both of Japan

[21] Appl. No.: 264,406

[22] Filed: May 18, 1981

[30] Foreign Application Priority Data

May 16, 1980 [JP] Japan ................... 55-65788

[51] Int. Cl.⁴ .................. C23F 11/04; C23F 11/18
[52] U.S. Cl. .................. 422/7; 241/DIG. 38; 252/626; 422/3; 422/9; 422/12
[58] Field of Search ............ 252/626, 146, 147; 260/687 R, 687 H; 423/20, 68, 522; 241/DIG. 38; 422/7, 9, 12, 3

[56] References Cited

U.S. PATENT DOCUMENTS

| | | | |
|---|---|---|---|
| 2,433,396 | 12/1947 | Proell | 260/687 |
| 2,475,969 | 7/1949 | Larrison et al. | 260/687 |
| 2,590,124 | 3/1952 | Reeder et al. | 260/687 |
| 3,873,362 | 3/1975 | Mihram et al. | 252/626 |
| 3,957,676 | 5/1976 | Cooley et al. | 252/626 |
| 4,221,768 | 9/1980 | Inoue et al. | 423/213.2 |
| 4,313,845 | 2/1982 | Cowan et al. | 252/626 |
| 4,349,465 | 9/1982 | Krug et al. | 252/626 |
| 4,356,148 | 10/1982 | Kagawa et al. | 422/9 |

FOREIGN PATENT DOCUMENTS

| | | |
|---|---|---|
| 30068 | 6/1981 | European Pat. Off. |
| 1418330 | 3/1974 | United Kingdom |
| 2050682 | 11/1980 | United Kingdom |

OTHER PUBLICATIONS

Stern, M. and C. Bishop, 1963, "Corrosion and Electrochemical Behavior", In: Sisco and Epremian, *Columbium and Tantalum*, John Wiley and Sons, New York, pp. 304–312, 579–596.

Tantulum: Acid-Proof Process Equipment, Dec. 1937, Fansteel Metallurgical Corporation, Chicago, Illinois, 33 pages.

*Primary Examiner*—Teddy S. Gron
*Assistant Examiner*—Howard J. Locker
*Attorney, Agent, or Firm*—Oblon, Fisher, Spivak, McClelland & Maier

[57] ABSTRACT

A method of minimizing corrosion deterioration and hydrogen absorption embrittlement of tantalum encountered in performing acid digestion of organic waste matter put in an acid digestion kettle of tantalum containing high temperature high concentration sulfuric acid includes the addition of nitric acid, nitrous acid, nitrates, nitrites and/or nitrogen oxides to the sulfuric acid bath.

4 Claims, 6 Drawing Figures

METHOD OF STABILIZED OPERATION OF ACID DIGESTION KETTLE OF TANTALUM

BACKGROUND OF THE INVENTION

1. Field of the Invention

The present invention relates to a method of operating an acid digestion kettle of tantalum or tantalum-base alloy for digestion of organic waste matter and more particularly relates to a method of ensuring stabilized continuous operation of an acid digestion kettle of tantalum or tantalum-base alloy by preventing advance of deterioration and embrittlement thereof due to hydrogen absorption.

2. Description of the Prior Art

In facilities handling nuclear fuel or other radioactive isotopes in general, it is necessary to protect the human body from exposure. Rubber products made by polymerization or copolymerization of chlorine-containing monomers such as vinyl chloride, vinylidene chloride and chloroprene are typical organic raw materials having radiation shielding ability. Body protectors made of these raw materials have to be treated for disposal after being used for long periods of time because of contamination by radioactive rays. Methods of treating such organic products contaminated by radioactive rays include the method of subjecting them to volume decrease and stabilization and then to compaction for convenient storage. There are several methods for performing this volume decrease and stabilization method, and the most effective one under investigation is to put the said organic products into a high temperature high concentration sulfuric acid bath to subject them to acid digestion. This method includes the following two treating steps, the conditions therefor being very severe.

(1) Decomposition of organic materials by sulfuric acid.
   (In the case of polyvinyl chloride)

$$(C_2H_3Cl)_n + nH_2SO_4 \rightarrow 2nC + nSO_2 + 2nH_2O + nHCl$$

(2) Oxidation of carbon by addition of nitric acid.

$$3C + 4HNO_3 \rightarrow 4NO + 3CO_2 + 2H_2O$$

The first treating step is usually performed in an 85% sulfuric acid bath at 200° C. or above for about 5 hours, followed by addition of nitric acid for the second treating step, which requires about 2 hours.

As for materials which can endure such severe conditions, platinum, high silicon cast iron, glass lined steel and tantalum (including tantalum-base alloys, hereinafter referred to briefly as Ta) are included. However, platinum is expensive, high silicon cast iron is brittle, and glass lined steel is difficult to process into a complicated shape and is liable to crack when subjected to thermal history. Thus, the remaining material, Ta must be considered. However, Ta is liable to corrode, though very little, and embrittle when it absorbs hydrogen resulting from such corrosion. Unless these problems are solved, therefore, Ta cannot be used as a material for acid digestion kettles.

Heretofore, little research on prevention of Ta corrosion has been conducted and this field of research remains substantially untouched. A known method of prevention of hydrogen absorption embrittlement is to stick a platinum foil to a portion of Ta surface to produce a kind of sacrificial cathode effect. However, corrosion weight loss of Ta advances so rapidly as to require frequent replacement of the foil, which is disadvantageous from the standpoints of efficiency of operation and economy.

SUMMARY OF THE INVENTION

A first object of the invention is to provide a method of stabilized operation of acid digestion kettles of Ta, effectively minimizing corrosion deterioration of Ta even under severe operating conditions for acid digestion.

Another object of the invention is to provide a method of stabilized operation of acid digestion kettles of Ta, minimizing embrittlement of Ta due to hydrogen absorption as well as said deterioration.

A further object of the invention is to provide a method of stabilized operation of acid digestion kettles of Ta, which, in performing continuous acid digestion treatment, makes it possible to accurately strengthen the method for inhibition of corrosion while gaining an exact picture of how corrosion advances.

A still further object of the invention is to provide a method which is capable of performing such corrosion inhibition and hydrogen embrittlement inhibition by using a simple mechanism.

These and other objects will become more apparent from the following description.

Each of the objects described above has been achieved by employing the present invention to be hereinafter described. The most important of the points of the present invention lies in the fact that when acid digestion of organic waste matter is performed by putting the same into an acid digestion kettle of Ta containing high temperature high concentration sulfuric acid, one or more of the elements selected from the group consisting of nitric acid, nitrous acid, nitrates, nitrites and nitrogen oxides are added to the sulfuric acid bath. Nitric acid, etc., must be present at least during decomposition of organic waste matter and the amount is preferably at least 10 ppm. In consideration of loss of nitric acid, etc., through evaporation, it is recommended to provide a fresh supply while measuring the self potential of Ta.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Effects of the addition of nitric acid, nitrous acid, nitrates and nitrites on corrosion prevention and hydrogen absorption prevention will first be described with reference to Table 1, and the effects of the addition of nitrogen oxides on the same will be described with reference to Table 2. A device shown in FIG. 1 was used to ascertain such effects.

Figure 1:
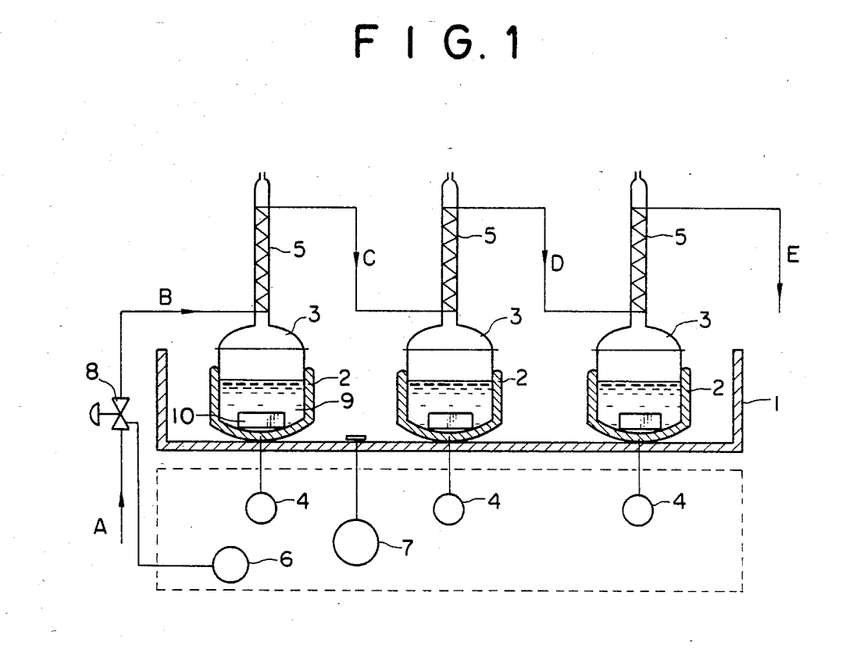
FIG. 1 is a schematic view illustrating a testing device for effecting corrosion of and hydrogen absorption by Ta test pieces.

In FIG. 1, a plurality of (three in the figure) mantle heaters 2 are installed on a tray 1 and a separable flask 3 equipped with a cooling condenser 5 is placed in each heater. Each flask 3 contains a sulfuric acid solution 9, in which a Ta sheet 10 of definite size (in the experiment, 2 mm×20 mm×20 mm) is immersed. In addition, cooling water is admitted in the direction of arrow A, flowing through a stop valve 8 and successive condensers 5, as indicated by arrows B, C and D, and is finally discharged as indicated by arrow E. In addition, numeral 4 denotes temperature measuring sensors; 6 denotes a water cut-off sensor; and 7 denotes a liquid leakage sensor. These sensors are installed in a control section surrounded with a chain line to provide for safety operation.

3 flasks each holding 95% sulfuric acid were divided into groups characterized by addition and nonaddition of nitric acid, nitrous acid and their salts, the sulfuric acid bath being maintained at 250° C. for 500-hour holding test. Upon completion of each test, the test piece was taken out, dried and weighed and the hydrogen concentration in Ta was measured. The average corrosion rate was calculated from a variation in weight produced during testing and is shown in Table 1.

TABLE 1

| No. | Acid or salt | Amount added (%) | Average corrosion rate (mm/year) | Hydrogen absorption (ppm) |
|---|---|---|---|---|
| 1 | — | — | 1.911 | 225 |
| 2 | $LiNO_3$ | 1 | 0.947 | 51 |
| 3 | " | 3 | 0.945 | 54 |
| 4 | $NH_4NO_3$ | 1 | 0.719 | 48 |
| 5 | " | 3 | 0.710 | 49 |
| 6 | $Fe(NO_3)_2$ | 0.1 | 0.581 | 1.2 |
| 7 | " | 1 | 0.576 | 1.0 |
| 8 | " | 3 | 0.571 | 0.8 |
| 9 | $Cu(NO_3)_2$ | 0.1 | 0.340 | 0.5 |
| 10 | " | 1 | 0.341 | 0.5 |
| 11 | " | 3 | 0.328 | 0.5 |
| 12 | $Ba(NO_3)_2$ | 0.1 | 0.310 | 0.9 |
| 13 | " | 1 | 0.311 | 0.5 |
| 14 | " | 3 | 0.302 | 0.7 |
| 15 | $Ni(NO_3)_2$ | 0.1 | 0.215 | 0.5 |
| 16 | " | 1 | 0.213 | 0.5 |
| 17 | " | 3 | 0.201 | 0.5 |
| 18 | $KNO_2$ | 1 | 0.845 | 34 |
| 19 | " | 3 | 0.813 | 36 |
| 20 | $NaNO_2$ | 1 | 0.798 | 29 |
| 21 | " | 3 | 0.778 | 27 |
| 22 | $HNO_3$ | 0.05 | 0.512 | 1.2 |
| 23 | " | 1 | 0.389 | 1.0 |
| 24 | " | 3 | 0.382 | 1.3 |
| 25 | " | 5 | 0.384 | 0.9 |
| 26 | $HNO_2$ | 1 | 0.364 | 1.1 |

TABLE 1-continued

| No. | Acid or salt | Amount added (%) | Average corrosion rate (mm/year) | Hydrogen absorption (ppm) |
|---|---|---|---|---|
| 27 | " | 2 | 0.360 | 1.8 |

As seen in Table 1, while the average annual corrosion rate for the test (No. 1) with no addition of nitric acid, nitrous acid, nitrates or nitrites was 1.911 mm, that for the tests with addition of such compounds showed 0.947 mm at worst and 0.201 mm at best, showing that the corrosion rate was decreased to about ½-1/10 of the reference value. A comparison in terms of hydrogen absorption shows that hydrogen absorption, which was 225 ppm for non-addition, was decreased to 54 ppm at worst and 0.5 ppm at best, it being seen that hydrogen absorption was improved to about ¼-1/450 of the reference value. Within the confines of the present tests, differential amounts of one and the same additive did not show so remarkable significance, indicating that there was very little additive quantity dependence.

No great difference was recognized in additive effects between nitric acid and nitrous acid. As for salts of these acids, investigations were made of salts of elements selected from the alkali metal elements, copper group elements, alkaline earth metal elements and iron group elements, and of ammonium salts, and it was found that they each exhibited corrosion inhibition effect and hydrogen absorption inhibition effect. The kind of salts to be used is, of course, not limited to those shown in Table 1, it being possible to make use of salts of other metal elements belonging to such groups, e.g., Mg, Ca, Sn, Co and Ni and salts of metal elements not belonging to such groups, e.g., Zn, Cd, Al, Ga, In, Sn, Pb, Cr, Mo and Mn. The applicable salts are not limited to the simple salts mentioned above, and other forms of salt, such as double salt and complex salt, may be added. Although no great difference was recognized in additive effects between nitrates and nitrites, it was found that salts of elements belonging to the copper group, alkaline earth metals and iron group tended to exhibit more remarkable effects than ammonium salts and alkali metal salts which are supposed to be relatively easily ionizable. Nitric acid, nitrous acid and their salts are added singly or in combination to the sulfuric acid bath at various stages of operation, e.g., when a sulfuric acid bath is prepared prior to decomposition, when organic matter is put into the kettle, or when the temperature of the sulfuric bath reaches a maximum, but it goes without saying that the earlier the better.

Further, investigations were made as to whether or not nitrogen oxide gases ($NO_x$) such as NO and $NO_2$ blown into the sulfuric acid provided similar effects, the results being shown herein. A testing device similar to the one shown in FIG. 1 was used and 95% sulfuric acid was put in each of the flasks, of which one (No. 28) had no $NO_x$ gas blown thereinto, others (Nos. 29-31) had NO gas blown thereinto, others (Nos. 32-34) had $NO_2$ gas blown thereinto, and the others (Nos. 35-37) had a mixed gas of NO and $NO_2$ in 1:1 ratio blown thereinto. After the blowing of gas for a predetermined period of time, the sulfuric acid bath temperature was gradually raised to 250° C., at which the bath was held for 500 hours.

In addition, the blowing of $NO_x$ gas was performed at the rate of 100 cc/min for 1, 3 and 5 hours. Thereafter, the average corrosion rate of Ta and its hydrogen con- centration were measured, the results being shown in Table 2.

TABLE 2

| No. | Gas blown | Blowing time (hours) | Average corrosion rate (mm/year) | Hydrogen absorption (ppm) |
|-----|-----------|----------------------|----------------------------------|---------------------------|
| 28  | —         | —                    | 1.911                            | 255                       |
| 29  | NO        | 1                    | 0.325                            | 1.7                       |
| 30  | "         | 3                    | 0.316                            | 1.7                       |
| 31  | "         | 5                    | 0.314                            | 1.4                       |
| 32  | $NO_2$    | 1                    | 0.317                            | 1.7                       |
| 33  | "         | 3                    | 0.320                            | 1.8                       |
| 34  | "         | 5                    | 0.310                            | 1.0                       |
| 35  | NO + $NO_2$ | 1                  | 0.298                            | 0.8                       |
| 36  | "         | 3                    | 0.278                            | 0.7                       |
| 37  | "         | 5                    | 0.280                            | 0.5                       |

As seen in Table 2, a sample having no $NO_x$ gas blown thereinto gave an average corrosion rate of about 2 mm/year and a hydrogen absorption of about 250 ppm, both values being high, but Nos. 29–37 having $NO_x$ gas blown thereinto greatly decreased both average corrosion rate and hydrogen absorption to about 0.25–0.33 mm/year and 0.5–1.8 ppm, respectively, which amply demonstrated the effects of the present invention. The length of time during which gas was blown to develop these effects did not have important influence, it being thought that there was very little dependence on the amount of gas blown in. Investigations were made as to what extent the gas blowing time could be decreased, and it was found that a period of about 10 minutes was sufficient for the gas blowing rate of 100 cc/min. It was also found that the lowest blowing time could be further decreased by about 7 minutes if the blowing of gas was attended with the stirring of the sulfuric acid bath. The gas blowing time was found to be influenced by the concentration and temperature of the sulfuric acid bath and the gas blowing rate. With these taken into account, it was concluded that the time for blowing $NO_x$ was not limited to being prior to the heating of sulfuric acid and that it might be blown in at the early stage of the decomposition of organic matter during heating if safety could be secured.

It has not been fully understood why the blowing of $NO_x$ gas provides such effects, but a separate research has revealed that the blowing of $NO_x$ gas causes the formation of nitrosylsulfuric acid in the sulfuric acid bath.

$NO + H_2SO_4 + OH^- \rightarrow NOHSO_4 + H_2O$ $NO_2 + H_2SO_4 + H^+ \rightarrow NOHSO_4 + H_2O$ $NO + NO_2 + 2H_2SO_4 \rightarrow 2NOSHO_4 + H_2O$ More particularly, the gas blown in is relatively quickly fixed as nitrosylsulfuric acid, which means that the rate at which it is absorbed by sulfuric acid is very high. Thus, it may be thought that this nitrosylsulfuric acid itself or ions of a nitrogen-containing compound produced by the decomposition of said acid, e.g., $NO_2^-$ stick to the Ta surface, thereby passivating the latter to prevent corrosion of Ta.

When nitric acid, nitrous acid, nitrates, nitrites or nitrogen oxides were added to a high temperature high concentration sulfuric acid bath, both corrosion and hydrogen absorption were simultaneously minimized, as described above, and all of the above tests showed a common feature that the desired effects depend little on additive concentration or on the amount of gas blown in. Therefore, as a basic principle, the present invention imposed no restriction on concentration. However, in order to make such effects more positive, the following test was conducted to determine a recommendable lower limit of concentration. As there was no substantial difference in concentration dependence tendency among the individual compounds, as described above, this test will be described with reference to nitric acid as a typical example, but it should be noted that the other additive compounds showed exactly the same tendency.

Figure 2:
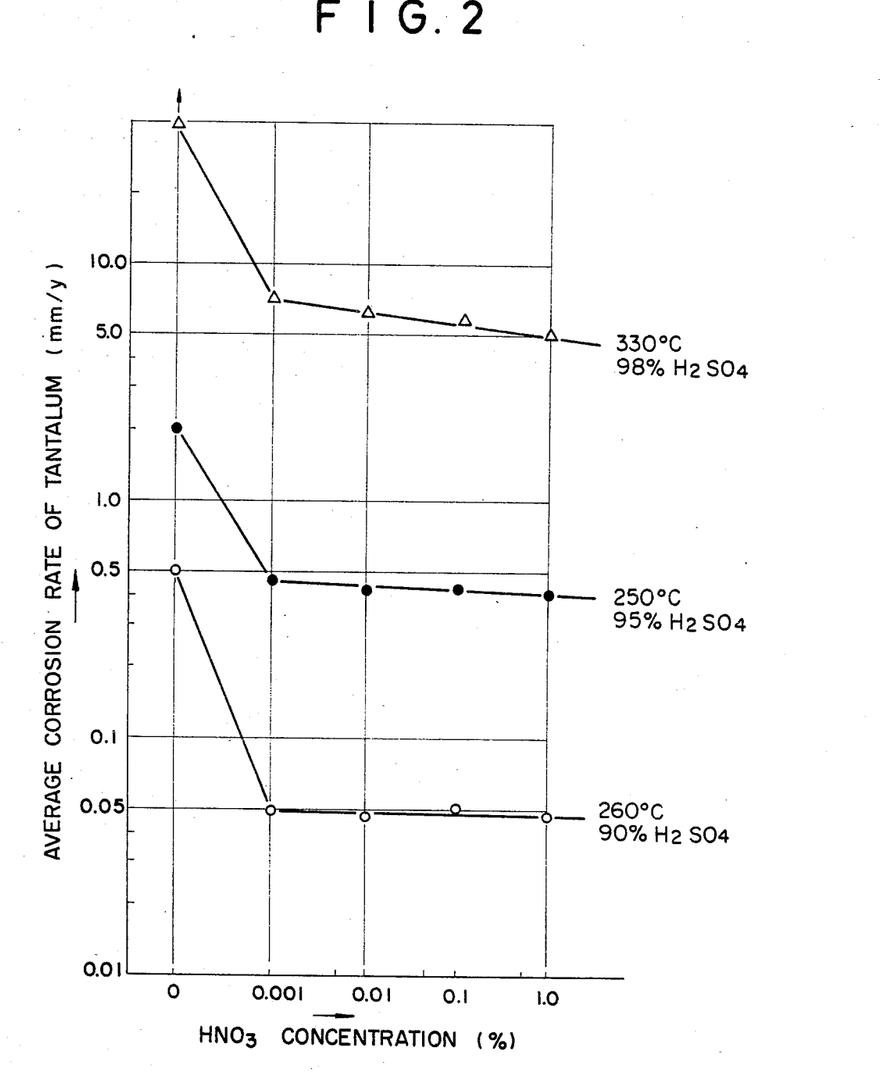
FIG. 2 is a graph showing the relation between nitric acid concentration and the average corrosion rate of Ta.
Figure 3:
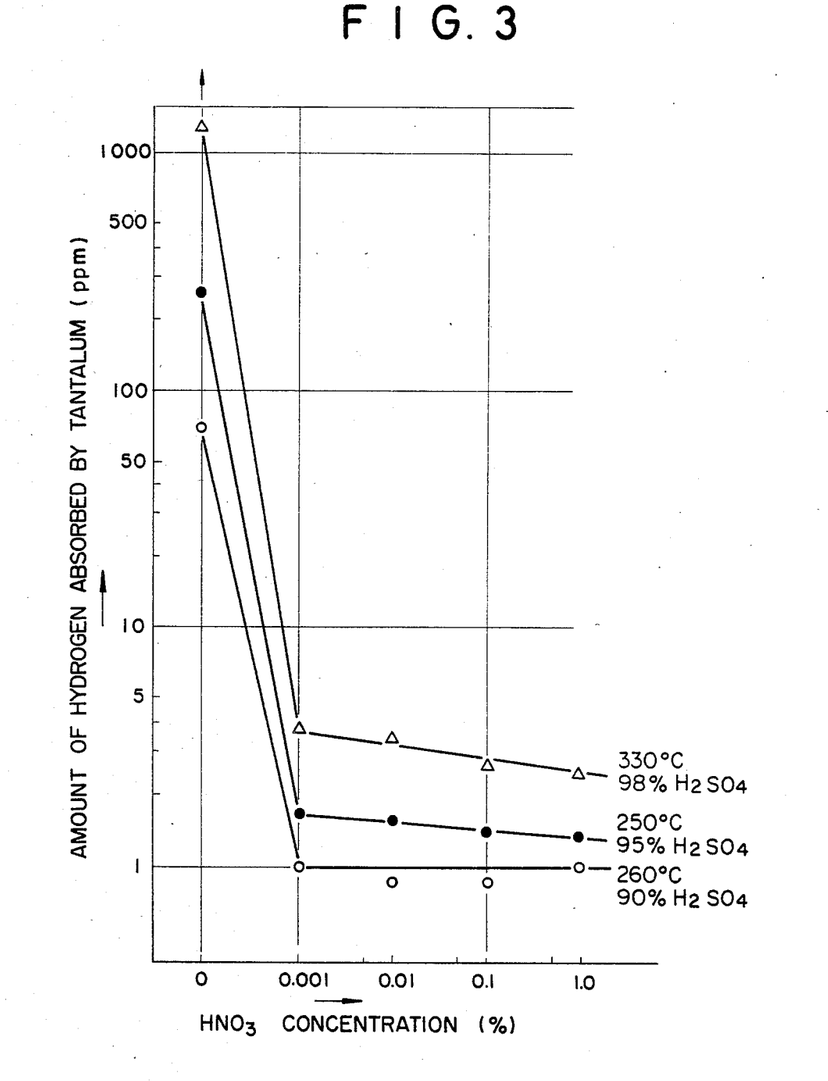
FIG. 3 is a graph showing the relation between nitric acid concentration and the amount of hydrogen absorbed by Ta.

Using the testing device shown in FIG. 1, acid digestion treatment baths containing 90% sulfuric acid (260° C.), 95% sulfuric acid (250° C.) and 98% sulfuric acid (330° C.) were prepared, and 500-hour treatment was performed under the conditions of non-addition, 0.001% (10 ppm) addition, 0.01% addition, 0.1% addition and 1.0% addition of nitric acid to determine the respective average corrosion rates of Ta test pieces. The results are shown in FIG. 2. In each case, if the additive amount is 10 ppm or above, the rate of corrosion was very low. In this test, hydrogen absorption by Ta test pieces was also measured and it was found that, as shown in FIG. 3, each bath, if given 10 ppm or more, showed greatly decreased absorption. With these results in mind, it was concluded that the recommendable lower limit of the amount of nitric acid, nitrous acid, their salts and nitrogen oxides to be added was 10 ppm.

While the description given so far has been based on pure tantalum, the same effects may be achieved with tantalum-base alloys such as Ta-Nb. Corrosion and hydrogen absorption are greatly decreased if acid digestion is performed under the conditions decribed above, but it has been found that the following precautionary steps must be taken if prolonged operation is to be performed.

Since the sulfuric acid which is the main ingredient of the treating bath is thermally fairly stable, there is no particular problem encountered in heating the bath to 330° C. as in the above tests. Nitric acid has a boiling point of 86° C. and its loss through evaporation must be taken into consideration. Therefore, it is desired to make a fresh supply of nitric acid or the like during decomposition of organic matter. However, the amount of nitric acid or the like may be small, as described above, and no method of measuring the concentration of such a small amount of nitric acid or the like in high temperature high concentration sulfuric acid has been known. Thinking that even if a chemically measuring method were developed, there would be problems of time lag and danger involved in sampling the solution, research was continued to develop a superior method.

Paying attention to (1) Ta corrosion advancing if the concentration of nitric acid or the like decreased excessively and (2) the possibility of changes in self potential being observed, the self potential of Ta immersed in a high temperature high concentration sulfuric acid bath was measured to find that the self potential was greatly influenced by the concentration of nitric acid or the like.

Figure 4:
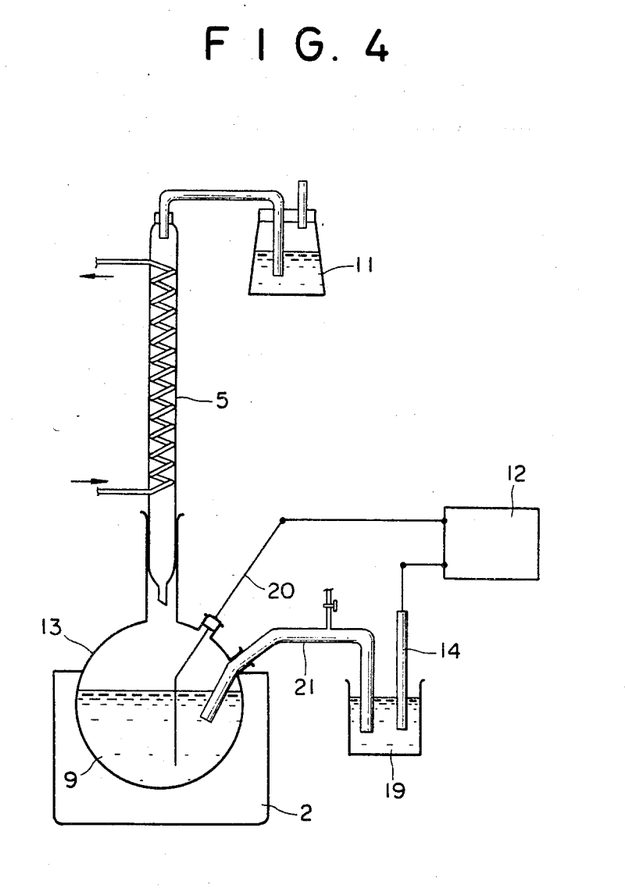
FIG. 4 is a schematic view illustrating a device for measuring changes in self potential produced as Ta corrosion advances.

FIG. 4 is a complete view showing an outline of a self potential measuring device. A three-necked flask 13 placed in a mantle heater 2 held a test solution 9. The test solution 9 prepared are classified into one containing 90% sulfuric acid alone, and the others containing 90% sulfuric acid plus 1%, 3% and 5% nitric acid, 0.1% copper nitrate, 1% sodium nitrite and a mixed gas of NO and $NO_2$ in 1:1 ratio blown thereinto. A Ta wire 20 serving as a sample electrode is immersed in the test solution 9 and a reference electrode (saturated calomel electrode) 14 is immersed in a 1N sulfuric acid solution 19. Liquid communication is established between the test solution 9 and the solution 19 by filling a glass tube 21 with table salt-containing agar. Numeral 12 denotes a constant potential electrolytic device, equipped with a potentiometer while numeral 11 denotes a trap.

Figure 5:
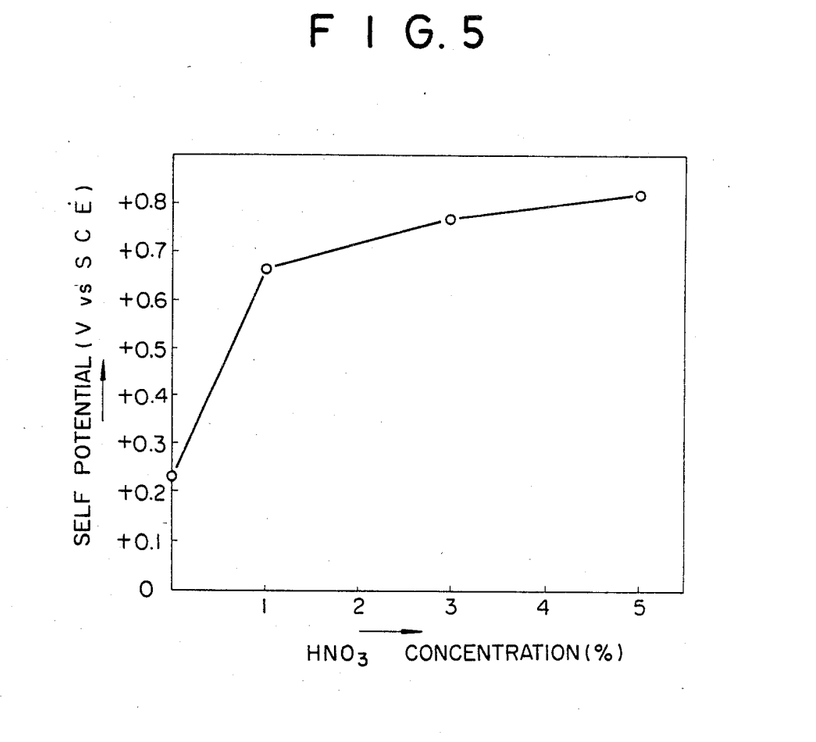
FIG. 5 is a graph showing the results of measurements of effects of nitric acid taken by the device of FIG. 4, showing the relation between nitric acid concentration added to a test solution and self potential.
Figure 6:
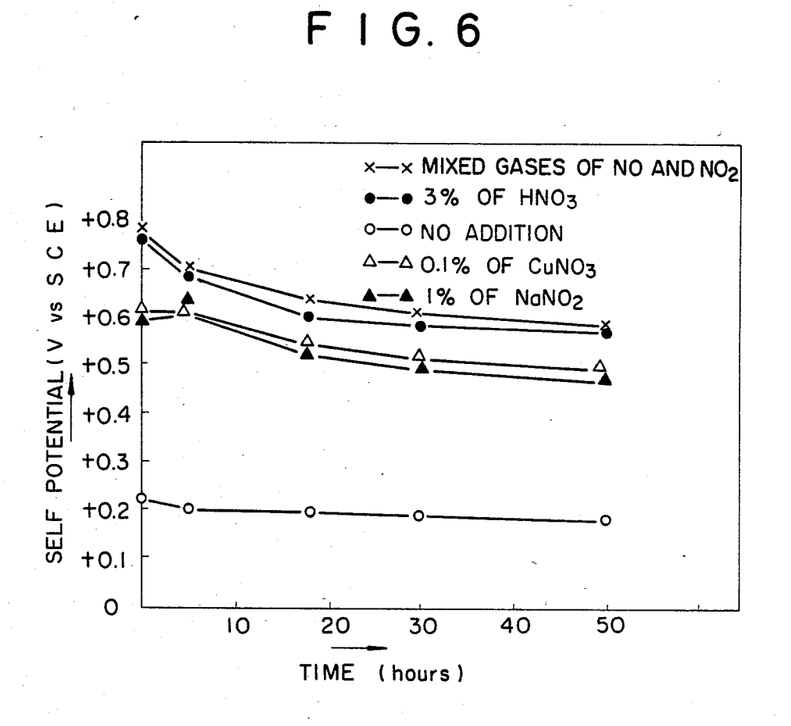
FIG. 6 is a graph showing changes in self potential when the device of FIG. 4 is operated for a long time while effecting corrosion prevention and hydrogen absorption prevention according to the present invention.

The test solution was heated to 250° C. and the potential difference between the sample electrode 20 and the calomel electrode (SCE) was measured. As a result, it was found that, as shown in FIG. 5, the self potential of Ta became nobler as the amount of nitric acid to be added was increased. Further, the test solutions containing 90% sulfuric acid and 90% sulfuric acid plus 3% nitric acid, 0.1% copper nitrate, 1% sodium nitrite and mixed gas of NO and $NO_2$ in 1:1 ratio blown thereinto, respectively, were heated to 250° C. and changes in their self potential with time were measured. It was found that, as shown in FIG. 6, the self potential for the 90% sulfuric acid having no nitric acid or the like added thereto was about +0.2 V (on the basis of SCE, hereinafter the same) but that the self potential for the 90% sulfuric acid having 3% nitric acid added thereto was initially about +0.76 V which then gradually decreased toward the less-noble end. The other test solutions having copper nitrate, sodium nitrite and mixed gas blown thereinto showed the same tendency. Thus, it has been found that in conducting continuous decomposition of organic matter, it is recommendable to make a fresh supply of nitric acid or the like at the stage where the self potential of Ta has lowered to some extent. As for the time at which a fresh supply is made, mention may be made of the time when the self potential has lowered to about +0.2 V, but if the amount of nitric acid or the like to be added initially is small, such a fresh supply will be made at an earlier period.

While the self potential of immersed Ta is measured, as decribed above, in the case of an acid digestion kettle of Ta actually used, the portion of the Ta kettle itself which is in contact with sulfuric acid may be used as a test electrode to form a more accurate judgment of the situation of corrosion. Further, the reference electrode is not limited to calomel electrodes: for example, a platinum reference electrode may be used. Methods of measuring self potential do not limit the invention.

The effects achieved by the present invention may by summarized as follows.

(1) Corrosion and hydrogen absorption embrittlement of Ta during acid digestion operation of acid digestion kettles of Ta are suppressed at the same time.

(2) The conditions for treatment are very simple since it is only necessary to add nitric acid or the like.

(3) Since an exact picture of how corrosion advances can be gained by measuring self potential, there is no danger of missing the proper timing for making a fresh supply of nitric acid or the like, thus ensuring that safety operation is effected continuously for a long time.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of maintaining the concentration of an anti-corrosion and anti-embrittlement agent in an acid digestion process above an effective level on the order of 10 ppm, said acid digesting process comprising the steps of:
    (a) placing a high temperature, high concentration sulfuric acid in an environment at least one of the boundaries of which is defined by structure composed of tantalum or a tantalum-based alloy;
    (b) placing organic waste matter in said environment for decomposition of the organic waste matter by the high temperature, high concentration sulfuric acid; and
    (c) adding on the order of 10 ppm of an anti-corrosion and anti-embrittlement agent selected from the group consisting of nitric acid, nitrous acid, nitrates, nitrite, nitrogen oxide, and combinations thereof to the sulfuric acid during the decomposition of the waste matter to minimize corrosion deterioration and hydrogen absorption embrittlement of the tantalum or tantalum-based alloy,
    said method of maintaining the concentration of the anti-corrosion and anti-embrittlement agent comprising the steps of:
    (d) measuring the self-potential of said structure while the organic waste matter is being digested and,
    (e) when the self-potential has decreased to on the order of +0.2 V, adding more of the anti-corrosion and anti-embrittlement agent so as to maintain the self-potential at not less than +0.2 V.

2. A method of maintaining the concentration of an anti-corrosion and anti-embrittlement agent in an acid digestion process above an effective level on the order of 10 ppm, said acid digestion process comprising the steps of:
    (a) placing a high temperature, high concentration sulfuric acid in an environment at least one of the boundaries of which is defined by structure composed of tantalum or a tantalum-based alloy;
    (b) placing organic waste matter in the environment for decomposition of the organic waste matter by the high temperature, high concentration sulfuric acid; and
    (c) adding on the order of 10 ppm of an anti-corrosion and anti-embrittlement agent selected from the group consisting of nitric acid, nitrous acid, nitrates, nitrite, nitrogen oxide, and combinations thereof to the sulfuric acid during the decomposition of the waste matter to minimize corrosion deterioration and hydrogen absorption embrittlement of the tantalum or tantalum-based alloy,
    said method of maintaining the concentration of the anti-corrosion and anti-embrittlement agent comprising the steps of:
    (d) continuously measuring the self-potential of said structure while the organic waste matter is being digested and
    (e) adding more of the anti-corrosion and anti-embrittlement agent as necessary to maintain the self-potential at not less than +0.2 V.

3. A method of stabilizing the acid digestion of organic waste matter, said method comprising the steps of:
    (a) placing a high temperature, high concentration sulfuric acid in an acid digestion kettle composed of tantalum or a tantalum-based alloy;
    (b) placing organic waste matter in said digestion kettle for decomposition of said organic waste matter by said high temperature, high concentration sulfuric acid;

(c) adding on the order of 10 ppm of at least one member selected from the group consisting of nitric acid, nitrous acid, nitrates, nitrite, and nitrogen oxide to said sulfuric acid during decomposition of said organic waste matter to minimize corrosion deterioration and hydrogen absorption embrittlement of the tantalum in said acid digestion kettle;

(d) measuring the self potential of said acid digestion kettle while said organic waste matter is being digested; and (e) when said self potential has decreased to on the order of +0.2 V, adding more of said at least one member so as to maintain said self potential at not less than +0.2 V.

4. A method of stabilizing the acid digestion of organic waste matter, said method comprising the steps of:

(a) placing a high temperature, high concentration sulfuric acid in an acid digestion kettle composed of tantalum or a tantalum-based alloy;

(b) placing organic waste matter in said digestion kettle for decomposition of said organic waste matter by said high temperature, high concentration sulfuric acid;

(c) adding on the order of 10 ppm of at least one member selected from the group consisting of nitric acid, nitrous acid, nitrates, nitrite, and nitrogen oxide to said sulfuric acid during decomposition of said organic waste matter to minimize corrosion deterioration and hydrogen absorption embrittlement of the tantalum in said acid digestion kettle;

(d) continuously measuring the self potential of said acid digestion kettle while said organic waste matter is being digested; and (e) adding more of said at least one member as necessary to maintain said self potential at not less than +0.2 V.

* * * * *

UNITED STATES PATENT AND TRADEMARK OFFICE
CERTIFICATE OF CORRECTION

PATENT NO. : 4,587,098
DATED : May 6, 1986
INVENTOR(S) : Ohtsuka, Katsuyuki et al.

It is certified that error appears in the above-identified patent and that said Letters Patent is hereby corrected as shown below:

On the title page:

-- The last inventor's last name has been misspelled on the Letters Patent. It should read as follows:

Fumio Kamikubo not

Fumio Kami Kubo --

Signed and Sealed this

Eighteenth Day of November, 1986

*Attest:*

DONALD J. QUIGG

*Attesting Officer*  *Commissioner of Patents and Trademarks*